(12) United States Patent
Patel et al.

(10) Patent No.: US 7,764,951 B2
(45) Date of Patent: Jul. 27, 2010

(54) TECHNIQUES FOR TRACKING COMMUNICATION FREQUENCY ACROSS COMMUNICATION MODALITIES

(75) Inventors: Labhesh Patel, San Francisco, CA (US); Sanjeev Kumar, San Francisco, CA (US); Joseph Khouri, San Jose, CA (US); Mukul Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 476 days.

(21) Appl. No.: 11/409,328

(22) Filed: Apr. 20, 2006

(65) Prior Publication Data

US 2007/0249410 A1    Oct. 25, 2007

(51) Int. Cl.
*H04M 3/42* (2006.01)
(52) U.S. Cl. .................. 455/414.1; 455/414.2
(58) Field of Classification Search ........................ None
See application file for complete search history.

(56) References Cited

U.S. PATENT DOCUMENTS

| | | | |
|---|---|---|---|
| 4,597,077 A | 6/1986 | Nelson et al. | |
| 4,625,081 A | 11/1986 | Lotito et al. | |
| 6,640,239 B1 * | 10/2003 | Gidwani | 709/203 |
| 6,678,684 B1 | 1/2004 | Koga et al. | |
| 6,687,339 B2 | 2/2004 | Martin | |
| 6,724,887 B1 | 4/2004 | Eilbacher et al. | |
| 6,728,728 B2 | 4/2004 | Spiegler et al. | |
| 6,757,362 B1 | 6/2004 | Cooper et al. | |
| 6,804,330 B1 | 10/2004 | Jones et al. | |
| 6,871,214 B2 | 3/2005 | Parsons et al. | |
| 6,941,184 B2 | 9/2005 | Ebert | |
| 6,957,199 B1 | 10/2005 | Fisher | |
| 6,957,393 B2 | 10/2005 | Fano et al. | |
| 6,993,011 B1 | 1/2006 | Kaplan et al. | |
| 7,020,494 B2 | 3/2006 | Spriestersbach et al. | |
| 7,020,618 B1 | 3/2006 | Ward | |
| 7,174,164 B1 * | 2/2007 | Knoop | 455/414.1 |
| 2003/0195937 A1 * | 10/2003 | Kircher et al. | 709/207 |
| 2004/0235520 A1 * | 11/2004 | Cadiz et al. | 455/557 |
| 2005/0130641 A1 * | 6/2005 | Lorraine Scott | 455/418 |
| 2006/0116113 A1 * | 6/2006 | Gass | 455/414.4 |
| 2006/0223495 A1 * | 10/2006 | Cassett et al. | 455/405 |
| 2007/0032267 A1 * | 2/2007 | Haitani et al. | 455/556.2 |
| 2007/0067439 A1 * | 3/2007 | Mason et al. | 709/224 |

* cited by examiner

*Primary Examiner*—Charles N Appiah
*Assistant Examiner*—Jaime M Holliday
(74) *Attorney, Agent, or Firm*—Trellis IP Law Group, PC (57) ABSTRACT

In on embodiment, techniques for providing alerts to a user when a communication frequency pattern between a user and a contact has not occurred during a pre-determined amount of time are provided. Communication records between the contact and the user can be analyzed to determine if the communication frequency pattern with the contact during the pre-determined amount of time does not meet pre-determined criteria. For example, the criteria may be generate an alert if communications do not occur in the last month, generate an alert if less than five communications occur in the last six months, or any other communication pattern. Also, the content of a communication may be analyzed to determine if a certain topic has been discussed. If a certain topic has not been discussed during the pre-determined amount of time, an alert may also be generated reminding the user that the topic has not been discussed.

43 Claims, 6 Drawing Sheets

TECHNIQUES FOR TRACKING COMMUNICATION FREQUENCY ACROSS COMMUNICATION MODALITIES

BACKGROUND OF THE INVENTION

Embodiments of the present invention relate in general to electronic communication systems and more specifically to techniques for generating an alert upon detection of a change in communication behavior between parties.

It is as important as ever to maintain a social network of personal contacts. A vital part of human nature is to be able to rely on others for support, information, entertainment and enlightenment. Social networks play major roles in business and education and also contribute to one's well-being and happiness. The best networks are often built upon trust between pairs of people so that one's reliance on the other does not go unmet and leads to a common goal.

However, it is probably more difficult than ever to maintain one's social network. This is due in part to the many types of electronic communication that are available today. For example, communication options include email, chat, instant messaging (IM), posting to bulletin boards, blogs, wikis, Internet Protocol (IP) based voice over IP (VoIP) phones, etc. Often, the many and varied communication options available make it very difficult to know how to reach another person. Also, the ease and speed with which messages are sent can require a person to respond to many messages each day in order to maintain a social network. Not only does this create a lot of work, it also can cause inadvertent errors or omissions such as failing to respond to another's inquiry, request or simple friendly salutation—the failure of which may cause insecurity, or a loss of faith or trust in the sender with regard to the silent recipient and thus can diminish a social network.

DETAILED DESCRIPTION OF EMBODIMENTS OF THE INVENTION

Embodiments of the present invention provide alerts to a user when a pattern of communication between a user and a contact has not occurred during a pre-determined amount of time. Communication records between the contact and the user can be analyzed to determine if a communication frequency pattern with the contact during the pre-determined amount of time does not meet pre-determined criteria. For example, the criteria may be: generate an alert if communications do not occur in the last month, generate an alert if less than five communications occur in the last six months, etc.

Also, embodiments of the present invention may analyze the content of a communication to determine if a certain topic has been discussed. If a certain topic has not been discussed during the pre-determined amount of time, an alert may also be generated reminding the user that the topic has not been discussed.

Communication records are analyzed for a plurality of communication modalities. A modality refers to a "mode" of communication. A modality can be distinguished by data format, type of signal, physical link or infrastructure, or other characteristic of a communication. For example, email, telephone, VoIP, instant messaging, chat, web posting, web page displaying, faxing, paging, etc., can each be considered a "modality." Also, a modality may be broken up into sub-modalities, such as instant messaging may be broken up into AOL AIM™, MSN Messenger™, and Yahoo! IM modalities.

The communication records for communications across the modalities may be stored for a user and analyzed for frequency of communication changes. The communication records may be any information for a communication and may include a call history, stored messages, etc. In one embodiment, a unified messaging system may be used to store the communication records. Although using a unified messaging system is described, it will be understood that other systems may be used. For example, systems for aggregating messages across non-enterprise modalities may be used.

Figure 1:
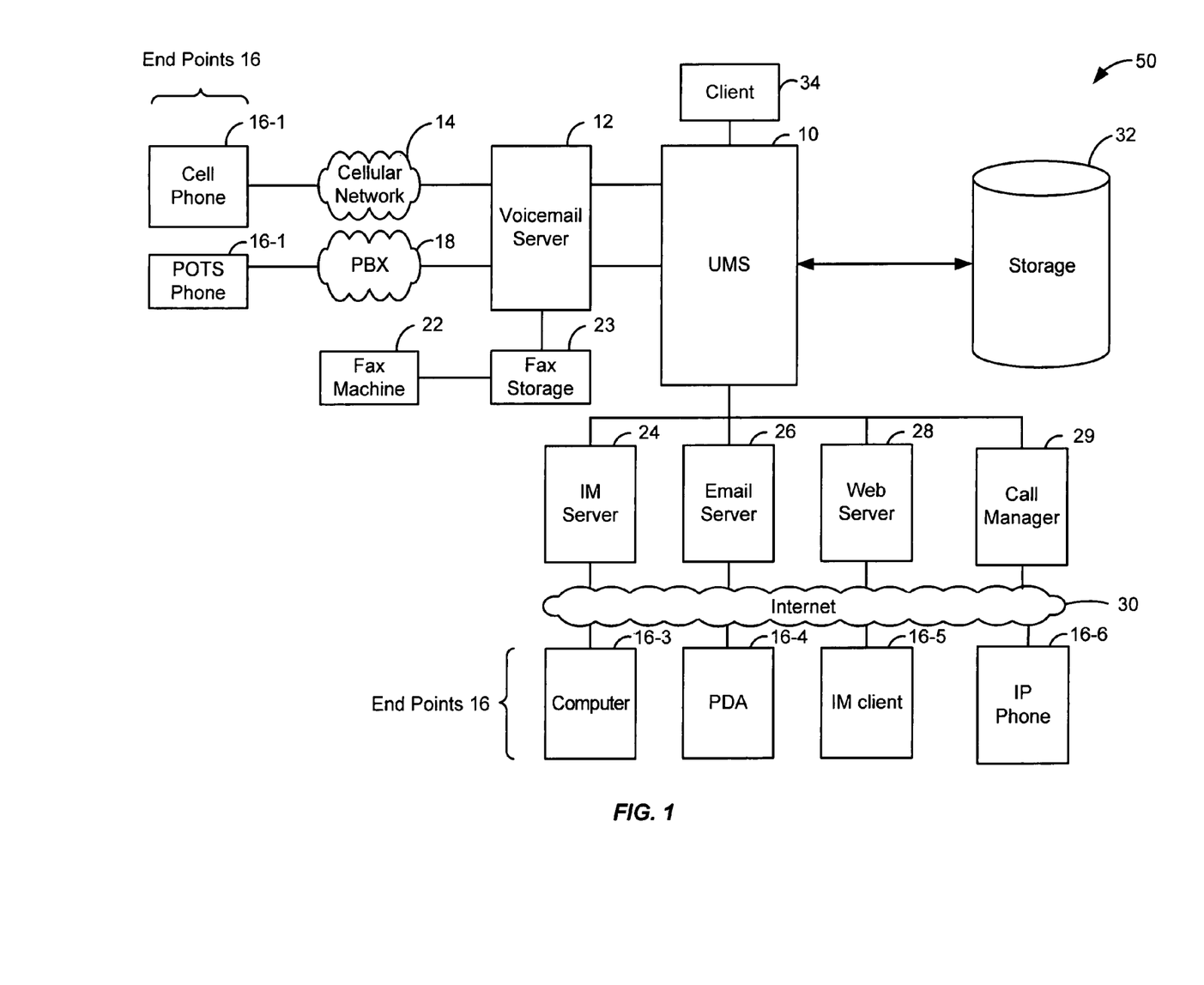
FIG. 1 depicts a unified messaging system environment according to one embodiment of the present invention.

FIG. 1 depicts a unified messaging environment 50 according to one embodiment of the present invention. Although the following unified messaging environment 50 is described, it will be recognized that variations of the environment will be appreciated by a person skilled in the art. As shown, a unified messaging system 10 and different communication modalities are provided.

In one embodiment, a unified messaging system (UMS) 10 provides a single access point for messages for a user regardless of the message type and the message origination (e.g., communication modality). For example, unified messaging system 10 may deliver emails, voicemails, instant messages, short message service (SMS) messages, and facsimile messages to a single inbox, such as a user's email box. Thus, the user can check all messages from a single point. Using unified messaging, the user can listen to his/her email over the telephone, check voice messages through their email inbox, view a fax through his/her email inbox, etc.

Various communication modalities are shown in environment 50. The various communication modalities may store communication records on various storage media. A communication record may be any record of a communication. The communication record may be an actual message that is sent or received. A modality refers to a "mode" of communication. A modality can be distinguished by data format, type of signal, physical link or infrastructure, or other characteristic of a communication. For example, email, telephone, VoIP, instant messaging, chat, web posting, web page displaying, faxing, paging, etc., can each be considered a "modality." Also, a modality may be broken up into sub-modalities, such as instant messaging may be broken up into AOL AIM™, MSN Messenger™, and Yahoo! IM modalities.

The various communication modalities may store messages on various storage media. Also, it may be a history of communications, such as a call history from an end device 16. The communication record may include the content of the message and also other identifying information, such as the sender, recipient, subject, header information, etc. In some cases, text-to-speech and speech-to-text converters may be used. For example, an email message may be converted into voice using a speech-to-text converter. Also, the email message may be stored and then the conversion is performed in real-time when the voice representation of the email message is needed.

Various end points 16 in environment 50 may be used to send messages to a user. End points 16 may include any devices that can communicate in a modality, such as a cell phone 16-1, a POTS phone 16-2, a computer 16-3, a personal digital assistant 16-4, an IM client 16-5, a router, etc.

As shown, a cell phone 16-1 may be used to send voice messages through a cellular network 14. The voice messages may be managed by voicemail server 12.

Also, a POTS phone 16-2 may be used to leave or send voice messages through a PBX system 18. Another modality may be a facsimile modality. As shown, a FAX machine 22 may send a FAX to the user stored in FAX storage 23.

Other communication modalities may use the Internet to communicate. Although the Internet is described, any packet-based network may be used, such as any local area network, wide area network, wireless network, etc. Email, voicemail, web pages, instant messages, etc. may be sent through Internet 30. As shown, instant messages may be stored on an IM server 24, emails may be stored on an email server 26, and web pages may be stored on a web server 28. End devices of a computer 16-3, PDA 16-4, IM client 16-5, or any other end device may be used to send messages to the user or used by the user to send messages to contacts. IP phone 16-6 is used to make voice over IP (VoIP) calls. A call manager 29 is used to manage the calls and any messages (e.g., voice messages) for the IP phone modality.

Although the above modalities are described, it will be understood that other communication modalities may be appreciated by persons skilled in the art. For example, unified messaging system 10 may access messages from enterprise modalities. An enterprise modality may be any modality controlled by an enterprise (e.g., a business or company). Examples include an enterprise's email, voicemail, etc. Although enterprise modalities are described, it will be understood that unified messaging system 10 may access non-enterprise messages. Also, techniques described below allow non-enterprise messages to be accessed.

Unified messaging system 10 is configured to aggregate communication records from various media into storage 32. Although it is described that communication records are stored in storage 32, it will be recognized that communication records do not have to be physically stored in a single storage device. For example, voice communication records may be stored on an email server. Also email communication records, instant messages, etc. may be stored on a voicemail server, etc. Thus, messages may be stored in multiple storage areas (i.e., distributed). However, for discussion purposes, it is assumed that communication records from various modalities will be discussed as being stored in storage 32. For example, communication records stored on IM server 24, email server 26, voicemail server 12, fax storage 23, and web server 28 may be logically aggregated by unified messaging system 10, but will be described as being stored in storage 32.

A client 34 may be used to view the communication records aggregated by unified messaging system 10. For example, a personal computer may be used to view email messages, voice messages, and faxes in an email inbox.

Embodiments of the present invention track communications between a user and the user's contacts. For example, communication records are stored for messages sent by a user or sent to the user using any of the communication modalities described above with respect to system 50. Also, embodiments of the present invention are not restricted to using the unified messaging system 10 for aggregating communication records. Other methods, such as using manual entry or downloading of communication history from non-enterprise clients of the user, may be used to aggregate communication records.

Figure 2:
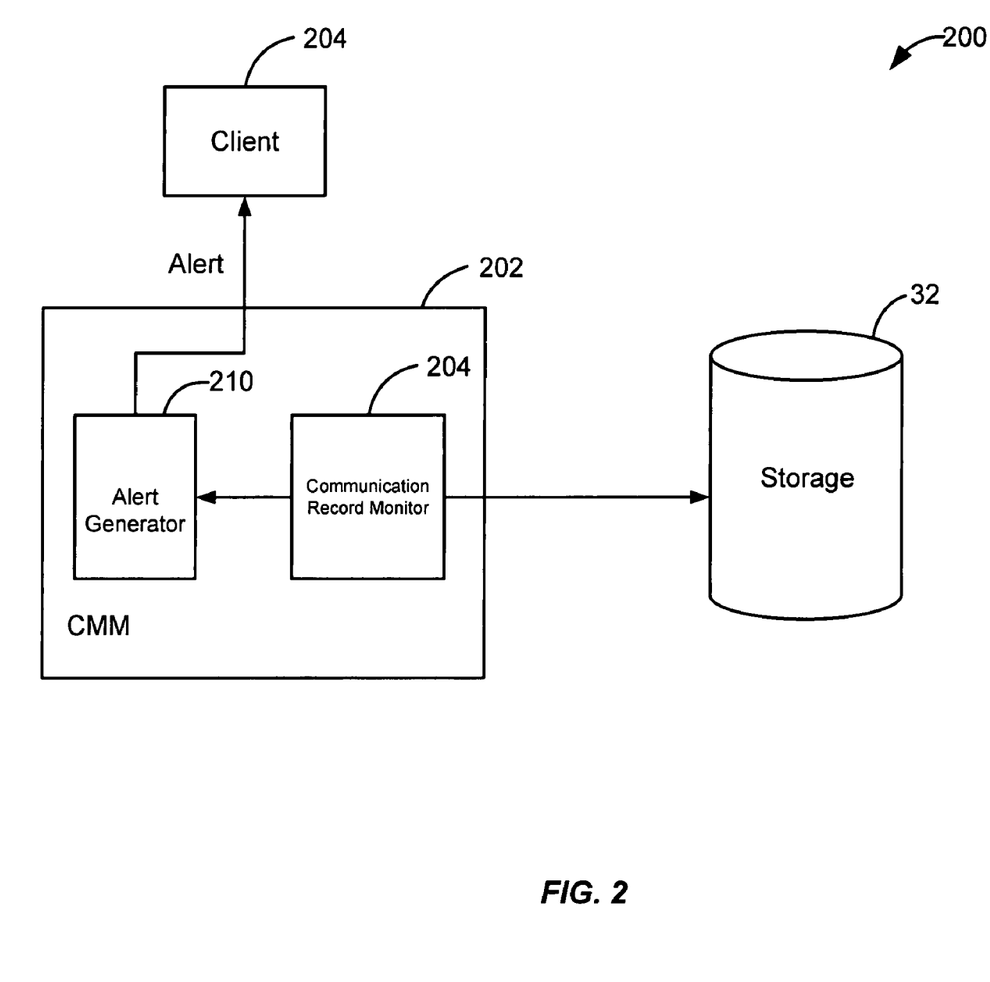
FIG. 2 depicts a simplified system for tracking communication frequency according to one embodiment of the present invention.

FIG. 2 depicts a simplified system 200 for tracking communication frequency according to one embodiment of the present invention. As shown, a communication manager module (CMM) 202 is provided for managing the frequency of a user's contact with contacts. In one embodiment, communication manager module 202 is part of unified messaging system 10. However, it will be recognized that communication manager module 202 may be part of any communication system that has access to a user's communication records.

Communication manager module 202 includes an interface module that provides an interface to allow a user to set which alerts are desired. A graphical-user interface and a telephone-user interface may be provided such that users can set reminders from a variety of end devices 16. For example, a user may select contacts from a contact list in which the user would like to be notified if the user's communication frequency pattern has not achieved a predetermined communication frequency pattern for a certain amount of time.

The communication frequency pattern may be checked across multiple modalities. Also, it will be recognized that a communication frequency pattern may be applied to specific modalities. For example, if the user has not sent an email to a contact after a certain amount of time but has sent an instant message, an alert may be generated that says the user has not sent an email but has sent an instant message.

A contact may be any user. Also, a contact may be identified differently across different communication modalities. Because of the different identifiers, the contact may be identified using a universal identifier. For example, the contact may be identified by the user's full name. The name may then also be associated with certain contact numbers, such as a telephone number, email address, instant message username, etc. For example, if the contact is named "Fred Mahoney", then the contact information for the contact may include a telephone number "415 555 5555", the email address "freddie@gmail.com", the instant messaging username "Freddie on AOL Messenger", etc. In this way, communication manager module 202 may intelligently determine which communications for a user are sent to the contact (or received from the contact).

Also, a mapping may be used. The mapping may map identifiers across different modalities to each other. For example, a username in an email modality is mapped to a username in an instant message modality.

Once the alerts are set, a communication record monitor 204 is configured to determine when a communication frequency pattern between the user and the contact has not occurred for the pre-determined amount of time. The communication frequency pattern may be any pattern of information. For example, the communication frequency pattern may include a communication frequency, i.e., a pattern of a number of times of communication between the user and the contact. Also, the communication frequency pattern may include discussion of a topic. For example, a user and contact may communication with each other but may not discuss a topic. The pattern may specify a frequency and also that a topic should be discussed.

Communication record monitor 204 may monitor communication records stored in storage 32. The communication records may include a call history, stored messages (e.g., email messages, instant messages, voicemails, etc.), or other records. If the communication frequency pattern does not reach a predetermined threshold (e.g., the contact was not communicated with enough or a topic was not discussed during the pre-determined amount of time), an indication is sent to an alert generator 210.

Alert generator 210 is configured to generate an alert for the user indicating that the communication frequency pattern has not been achieved. For example, the message may say "Reminder: Joe has not been contacted in a month". This reminds the user that a communication frequency pattern was not achieved during a certain amount of time.

In one embodiment, a user may set preferences as to how the user should be alerted. For example, if the contact is a very important contact, then the communication method may be through an instant message or cellular phone call. However, if the contact is low priority, an email message may be sent to the user.

Figure 3:
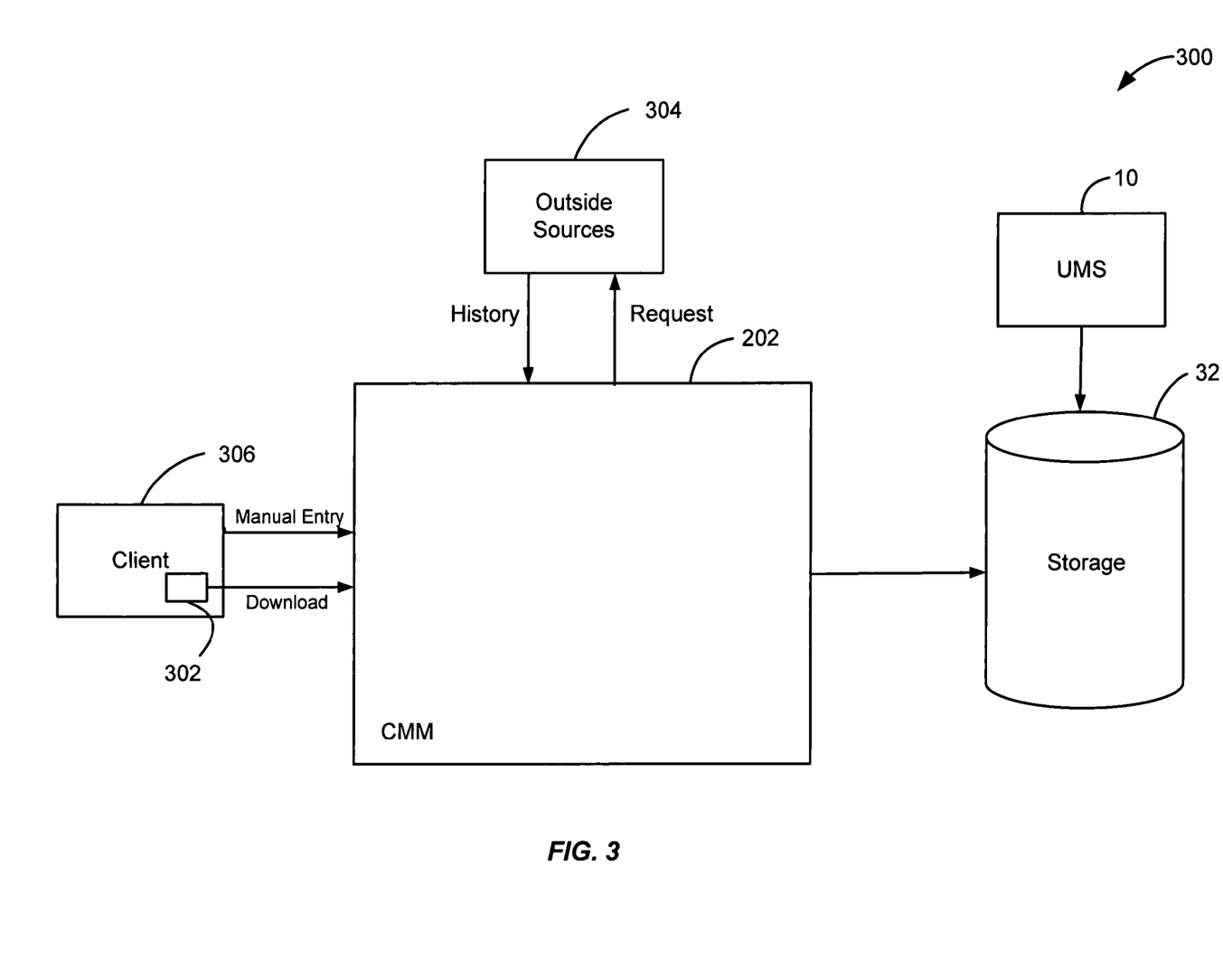
FIG. 3 depicts various methods of storing communication records in storage according to one embodiment of the present invention.

As discussed above, different methods for storing communication records in storage 32 may be appreciated. FIG. 3 depicts various methods of storing communication records in storage 32 according to one embodiment of the present invention. As shown, communication manager module 202 is configured to store communication records in storage 32 in addition to records stored by unified messaging system 10. Although communication manager module 202 is described as being separate from unified messaging system 10, it will be understood that communication manager module 202 may be part of unified messaging system 10 and vice versa. Also, the functions performed by communication manager module 202 and unified messaging system 10 may be distributed between the entities.

In one embodiment, the following techniques may be used to store non-enterprise communication records. For example, unified messaging system 10 may have access to communication records of an enterprise. Unified messaging system 10 then can access communication records for communications using enterprise modalities, such as an enterprise email address, an enterprise voicemail system, an enterprise instant message client, etc. However, non-enterprise communications may not be accessible by system 10. For example, unified messaging system 10 may not be able to access messages from a user's home email address or a voice messages from a user's cellular phone. Accordingly, embodiments of the present invention provide access to communication records from non-enterprise modalities.

An agent 302 may be downloaded by a client 306 of the user. Client 306 may be any of the end devices 16 shown in FIG. 1. For example, the agent 302 may be downloaded on a user's personal computer 16-3, PDA 16-4, cellular phone 16-1, or any other end device 16.

Agent 302 may be configured to record a user's communication history on client 306. The communication history may include communications to the user from contacts and from the user. Agent 302 may track the number of communications and communication times for the communications. Also, the last communication time between the user and the contact on instant messaging, or the last email communication with the contact using a public email system, such as Google's gmail™, may be tracked if the user wants to be alerted when no communications occur during a time period.

Communication manager module 202 then receives a download of the communication history from agent 302. The time of the communications in addition to possibly the content may be downloaded to communication manager module 202. For example, client 306 may be a cellular telephone in which the call history is sent to communication manager module 202 through a secure data channel. If client 306 is a VoIP client, any VoIP communication records may be downloaded to communication manager module 202 by agent 302.

Also, outside sources 304 may be used to aggregate communication records between a user and a contact. For example, outside sources 304 may be any entities that may aggregate communication records for a user. Many public messaging and telephony systems may provide information that includes a user's call history. For example, a telephony company's web site may provide a user's call history, which can be downloaded or viewed.

Communication manager module 202 may log on to the website and download the call history from an outside source 304. For example, communication manager module 202 may receive the user's credentials to his/her account. Communication manager module 202 may then periodically log in to the user's account using those credentials and download his/her call history using techniques, such as screen scrapping or any other techniques necessary. For example, communication manager module 202 may log on to a cellular telephone account and download the call history for a user's cellular telephone. Further, communication manager module 202 may log on to a non-enterprise email system, such as Gmail™, and download a status of emails in a user's account.

Further, a user may manually enter information for a communication. For example, a face-to-face meeting may not generate any automatic written records. Thus, a user may use a client 306 to manually enter that a face-to-face meeting with a contact has occurred. This may be used to track any kind of contact that communication manager module 202 cannot automatically retrieve.

As discussed above, to ensure mapping between communication records for a contact submitted by agent 302 and various other systems, such as the unified messaging system 10, a mapping may be used. For example, for a contact, the user may add various identifiers that map communication records downloaded by agent 302, outside sources 304, and manually entered records to a universal identifier for a contact in storage 32.

Figure 4:
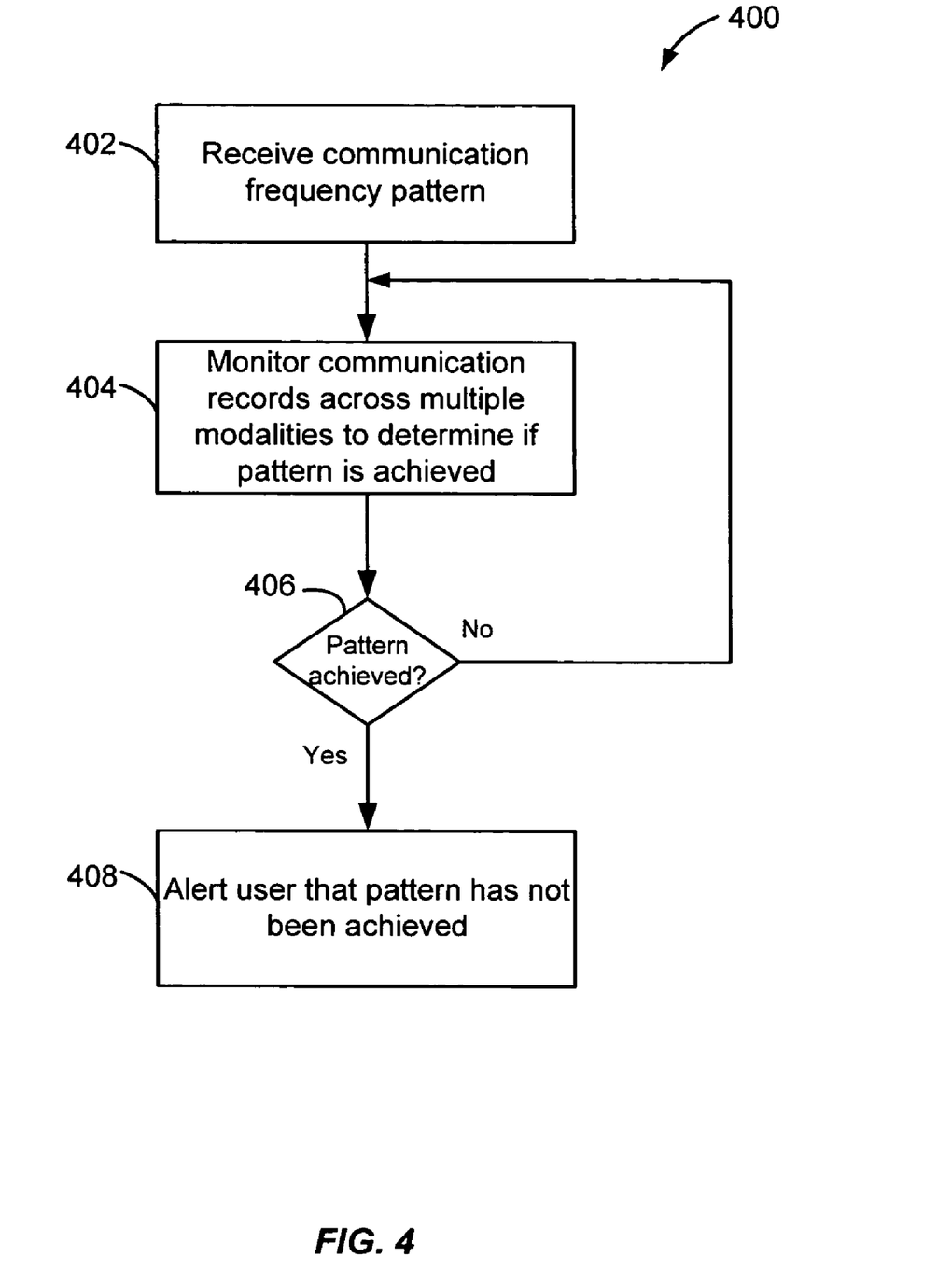
FIG. 4 depicts a simplified flow chart of a method for tracking communication frequency according to one embodiment of the present invention.

FIG. 4 depicts a simplified flow chart 400 of a method for tracking communication frequency according to one embodiment of the present invention. In step 402, a communication frequency pattern between a user and a contact is received. The pattern may generate an alert if no communication is received, which will be described in more detail below, or may be more complicated, such as generate an alert if a number of communications in multiple modalities do not reach a frequency during a time period, such as once a week for a month. Also, the discussion of a topic may be included in the pattern, such as a topic should be discussed in a communication during the time period.

In step 404, the communication records across multiple modalities are monitored to determine if the communication frequency pattern is not achieved. In step 406, if the pattern is achieved, then the process reiterates to step 404 to continue monitoring for possibly another time period. The analysis may include any methods to determine if the pattern reaches a predetermined threshold. For example, the number of communications between a contact and a user may be compared to a number. If the number is not reached, then the pattern is not achieved.

In step 408, if the pattern is not achieved, then the user is alerted that the communication frequency pattern has not been achieved.

Figure 5:
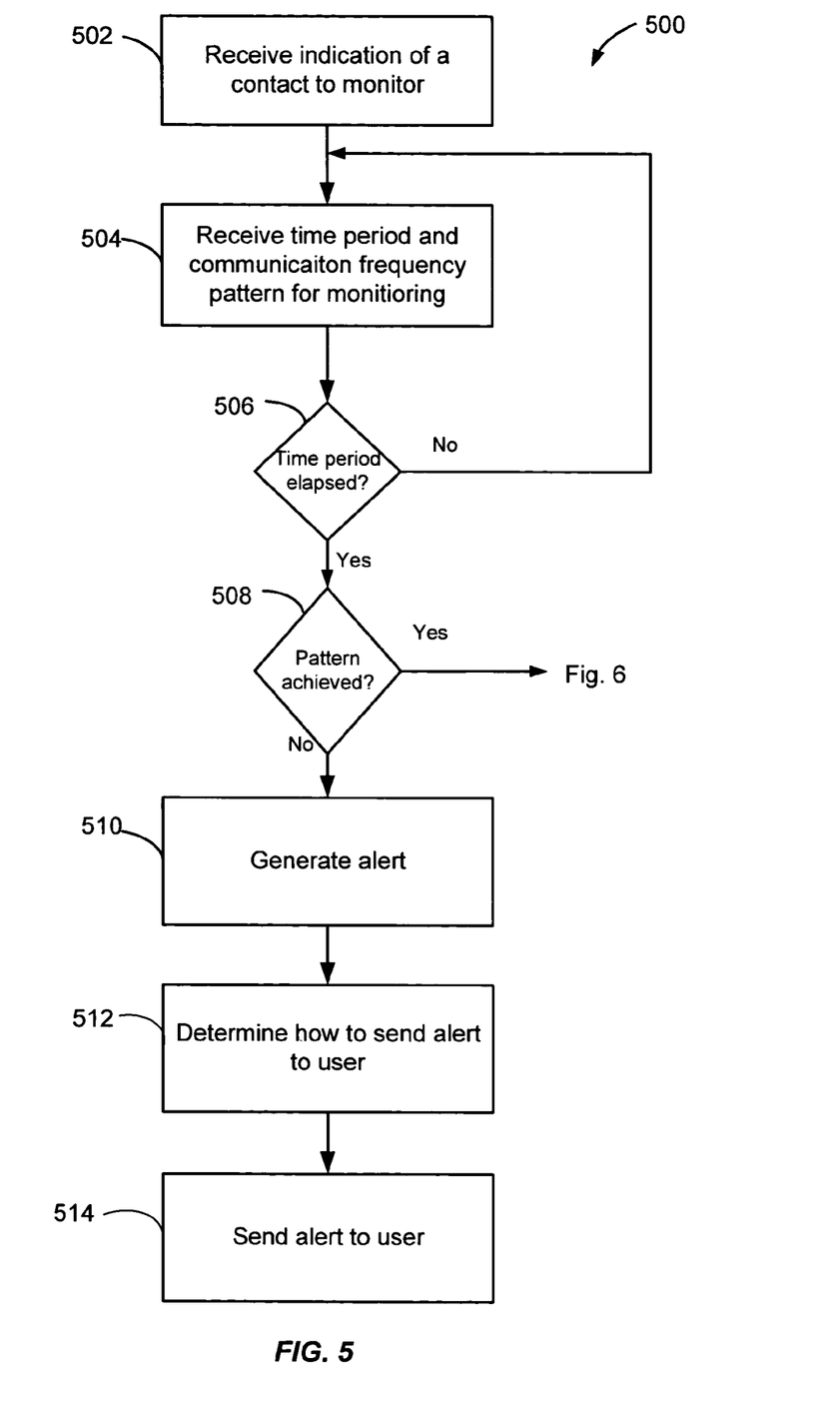
FIG. 5 depicts a simplified flow chart of a method for tracking when no communication frequency has been found across modalities according to one embodiment of the present invention.
Figure 6:
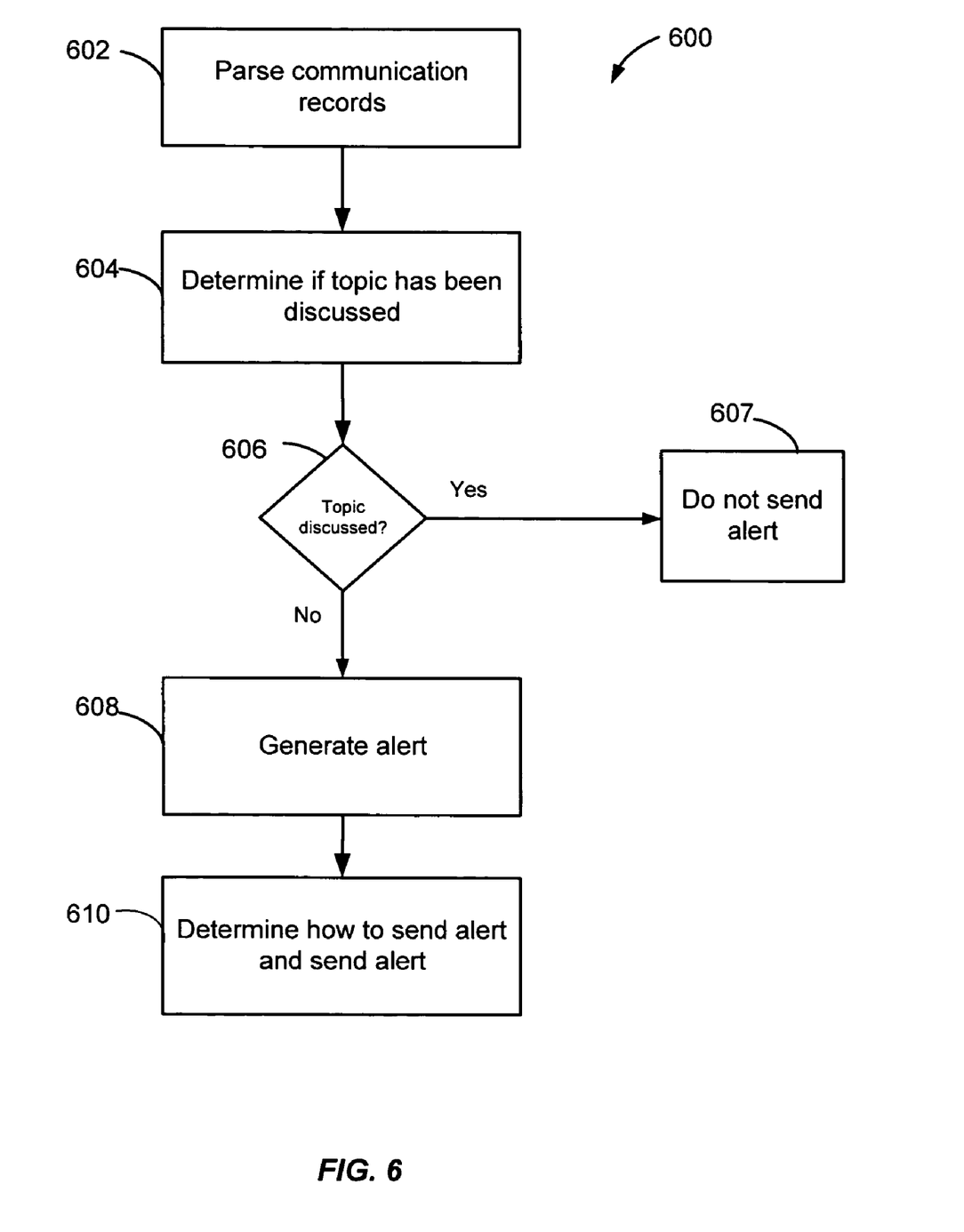
FIG. 6 depicts a simplified flow chart of a method for analyzing content of communication records to determine if an alert should be generated according to one embodiment of the present invention.

An exemplary embodiment of the method depicted in FIG. 4 is shown in FIGS. 5 and 6. FIG. 5 depicts a simplified flow chart 500 of a method for tracking communication frequency according to one embodiment of the present invention. In step 502, communication manager module 202 receives an indication of a contact to monitor. For example, the user may select a contact from a personal contact list. The indication may be a universal identifier for the contact. Also, the indication may be an identifier in a communication modality. Communication manager module 202 may then determine other identifiers in other communication modalities either by using the universal identifier or other mappings.

In step 504, communication manager module 202 receives a time period and communication frequency pattern for monitoring. The time period may specify an elapsed time, a certain date, or any other time information. The communication frequency pattern may be a number of times of communication. For example, the pattern may specify that N communications should occur in the time period.

In step 506, communication manager module 202 determines if the time period has elapsed. If the time period has not elapsed, the process reiterates to continue the monitoring.

If the time period has elapsed, in step 508, communication manager module 202 determines if a communication record in a modality indicates the communication frequency pattern has been achieved during the time period. If N communications were specified, the number of communications may include a communication from the user to the contact, from the contact to the user, or both. A user's preferences may indicate if one or other, or both should be used. If the communication frequency pattern has been achieved, then the process may end or may continue to determine if a topic was discussed in the communications (as described in FIG. 6). This depends on a user's preferences.

If the communication frequency pattern has not been achieved, then, in step 510, communication manager module 202 generates an alert. In step 512, communication manager module 202 determines how to send the alert to the user. For example, different communication modalities may be used depending on the contact. Also, if multiple time periods have elapsed and the user still has not contacted the contact, even if alerts have previously been sent, then a more urgent communication alert may be sent using a communication modality.

In step 514, communication manager module 202 sends the alert to the user.

Even if the communication frequency pattern has been achieved, an alert may still be generated by communication manager module 202 if a topic has not been discussed. FIG. 6 depicts a simplified flow chart 600 of a method for analyzing content of communication records to determine if an alert should be generated according to one embodiment of the present invention. In step 602, communications records for a contact are parsed. The communication records may be parsed using a variety of techniques. For example, natural language semantic parsers and topic detection techniques may be used to parse the communications.

In one embodiment, in step 604, the parsing may be used to determine if a topic has been discussed in the communication records. A topic may be any category of information. For example, a topic may be a certain subject, such as a birthday.

In step 606, communication manager module 202 determines if the topic has been discussed in the pre-determined time period. Thus, even though communications between the user and the contact may have occurred, the topic may or may not have been discussed. If the topic has been discussed, then in step 607, an alert does not need to be generated.

In step 608, if the topic has not been discussed within the time period, however, then an alert is generated. This is because even though a communication may have occurred, the communications did not occur on the desired topic.

In step 610, the alert is then sent as described in steps 410 and 412 of FIG. 4. The alert may indicate that a topic has not been discussed with the contact during a time period.

One example of how the process of FIG. 6 may be used is if a user wants to set a reminder if the user does not wish Happy Birthday to his/her Mom on October 10th by 8:00 p.m., an alert should be generated. Communication manager module 202 then may generate an alert if it does not detect a birthday greeting in any monitored communication between the user and his/her Mom by the specified date. Accordingly, communication records between user and his/her Mom may be parsed to determine if the term "Happy Birthday" (or any other information that indicates a birthday was discussed) is included in communications to the Mom. This may indicate that the topic of a birthday may have been discussed.

Many communication modalities may be monitored to determine if user wished Happy Birthday to his/her Mom. For example, communication records for instant messaging, email, voicemail, etc. may be monitored. This provides additional intelligent processing. If the user has already spoken with his/her Mom but has not wished her Happy Birthday, then a reminder will be sent. In one embodiment, a communication frequency pattern may use the topic in its pattern. Thus, user can intelligently determine when a contact should be contacted and also when a topic has not been discussed.

Embodiments of the present invention provide many advantages. For example, intelligent reminders may be set for the maximum time elapsed between communications for users. Also, the communications are tracked across multiple modalities. Thus, communications across phone, email, instant messaging, etc. may be tracked together.

Further, communication history from both enterprise and public messaging systems may be tracked and stored. This allows a complete solution for determining whether a reminder should be sent.

Communication manager module 202 may add to the revenue of an enterprise by ensuring regular communication with potential customers and business partners. Also, communication manager module 202 alleviates redundant communications to a contact when a user forgets the last time user communicated with the contact. Embodiments of the present invention enhance social networking and also enable users to not lose contact with others in an easy and intelligent way.

The term "contacting" and variants thereof (e.g., connecting, connection, connect) as used in this disclosure are intended to be construed broadly. For example, contacting user may be achieved by using any type of communication link, mode, signal type, protocol, format, etc., as desired. Any number and type of devices can be used to achieve the contacting of a user.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components, and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method comprising:
    establishing a predetermined communication frequency pattern between first and second users;
    determining first records of enterprise communications for the first user communicated with an enterprise system, the first records being communicated in at least two modalities over one or more devices, a modality being a mode of communication, and wherein the first records are accessible to the enterprise system associated with an entity;

sending an agent to a first device to monitor non-enterprise communications for the first user, the non-enterprise communications being communicated in at least two modalities over one or more devices not accessible to the enterprise system;

receiving second records of non-enterprise communications from the agent at a second device controlled by the enterprise system;

measuring a communication frequency pattern using the first records of the enterprise communications and second records of the non-enterprise communications; and alerting at least one of the first and second users when the measured communication frequency pattern between the first and second users in at least two modalities over the one or more devices of the enterprise system and the non-enterprise system does not achieve a predetermined relationship with respect to the predetermined communication frequency pattern.

2. The method of claim 1, wherein establishing the predetermined communication frequency pattern includes expected transmissions over time.

3. The method of claim 2, further comprising determining when a predetermined interval of time passes, wherein a count of transmissions occurring in the predetermined interval is less than a value derived from the expected transmissions over time.

4. The method of claim 3, wherein the count of transmissions over the predetermined interval is zero.

5. The method of claim 1, wherein establishing the predetermined communication frequency pattern includes discussion of a topic over a time period, the method further comprising:

analyzing the first records of enterprise communications and second records of non-enterprise communications to determine if the topic is discussed in the first or second records; and alerting at least one of the first and second users when the topic is not discussed over the time period.

6. The method of claim 5, further comprising determining when time period passes, wherein a count of discussions of the topic occurring in the time period less than a value derived from the discussions of the topic over time triggers the alerting.

7. The method of claim 1, wherein the alert includes information about a transmission between the first and second users.

8. The method of claim 1, further comprising:
accepting a signal from a user input device; and
using, at least in part, the signal from the user input device to set the communication frequency pattern.

9. The method of claim 1, wherein monitoring communications comprises monitoring communication information received from a manual input from the user.

10. A method comprising:
accessing communication records for a contact of a user, the communication records comprising first records and second records, wherein the first records are of enterprise communications for the user communicated with an enterprise system, the first records being communicated in at least two modalities over one or more devices, a modality being a mode of communication, and wherein the first records are accessible to the enterprise system, the enterprise system associated with an entity, wherein the second records are of non-enterprise communications received at a second device controlled by the enterprise system from an agent sent to a first device to monitor non-enterprise communications for the user, the non-enterprise communications being communicated in at least two modalities over one or more devices not accessible to the enterprise system;

determining from the first records and the second records of the communication records if a communication between the contact and the user has occurred for a predetermined amount of time in at least two modalities over the one or more devices of the enterprise system and the non-enterprise system;

if a communication between the user and the contact has not occurred during the predetermined amount of time, performing the steps of:

generating an alert for the user; and sending the alert to the user such that the user is notified that a communication with the contact has not occurred for the amount of time.

11. The method of claim 10, wherein if a communication between the contact and the user has occurred, performing the steps of:

analyzing the first records of enterprise communications and second records of non-enterprise communications to determine if the topic is discussed in the first or second records; and alerting at least one of the first and second users when the topic is not discussed over the time period.

12. The method of claim 10, wherein the at least two modalities accessible to the enterprise or not accessible to the enterprise comprise at least two modalities selected from the set of an email modality, a facsimile modality, a voicemail modality, a web modality, and an instant message modality.

13. The method of claim 10, further comprising storing the communication records in one or more storage devices.

14. The method of claim 13, wherein the communication records are stored by a unified messaging system.

15. The method of claim 10, wherein the communications records are received from a manual input from the user.

16. The method of claim 10, wherein the contact comprises an identifier for a second user.

17. The method of claim 16, wherein the identifier is a universal identifier that is mapped to a plurality of identifiers in the plurality of communication modalities.

18. A device comprising:
logic configured to establish a predetermined communication frequency pattern between first and second users;

logic configured to determine first records of enterprise communications for the first user communicated with an enterprise system, the first records being communicated in at least two modalities over one or more devices, a modality being a mode of communication, and wherein the first records are accessible to the enterprise system associated with an entity;

logic configured to send an agent to a first device to monitor non-enterprise communications for the first user, the non-enterprise communications being communicated in at least two modalities over one or more devices not accessible to the enterprise system;

logic configured to receive second records of non-enterprise communications from the agent at a second device controlled by the enterprise system;

logic configured to measure a communication frequency pattern using the first records of the enterprise communications and second records of the non-enterprise communications; and logic configured to alert at least one of the first and second users when the measured communication frequency pattern between the first and second users in at least two modalities over the one or more devices of the enterprise system and the non-enterprise system does not achieve a predetermined relationship with respect to the predetermined communication frequency pattern.

19. The device of claim 18, wherein the predetermined communication frequency pattern includes expected transmissions over time.

20. The device of claim 18, further comprising logic configured to determine when a predetermined interval of time passes, wherein a count of transmissions occurring in the predetermined interval is less than a value derived from the expected transmissions over time.

21. The device of claim 20, wherein the count of transmissions over the predetermined interval is zero.

22. The device of claim 18, wherein the predetermined communication frequency pattern includes discussion of a topic over a time period, the logic further configured to:
   analyze the first records of enterprise communications and second records of non-enterprise communications to determine if the topic is discussed in the first or second records; and
   alert at least one of the first and second users when the topic is not discussed over the time period.

23. The device of claim 22, further comprising logic configured to determining when the time period passes, wherein a count of discussions of the topic occurring in the time period less than a value derived from the discussions of the topic over time triggers the alerting.

24. The device of claim 18, wherein the alert includes information about a transmission between the first and second users.

25. The device of claim 18, further comprising:
   logic configured to accept a signal from a user input device; and
   logic configured to use, at least in part, the signal from the user input device to set the predetermined communication frequency pattern.

26. The device of claim 18, wherein monitoring communications comprises monitoring communication information received from a manual input from the user.

27. A device comprising:
   logic configured to access communication records for a contact of a user, the communication records comprising first records and second records, wherein the first records are of enterprise communications for the user communicated with an enterprise system, the first records being communicated in at least two modalities over one or more devices, a modality being a mode of communication, and wherein the first records are accessible to the enterprise system associated with an entity, wherein the second records are of non-enterprise communications received at a second device controlled by the enterprise system from an agent sent to a first device to monitor non-enterprise communications for the user, the non-enterprise communications being communicated in at least two modalities not accessible to the enterprise system;
   logic configured to determine from the communication records if a communication between the contact and the user has occurred for a predetermined amount of time in at least two modalities over the one or more devices of the enterprise system and the non-enterprise system; if a communication between the user and the contact has not occurred during the predetermined amount of time, the device comprising:
   logic configured to generate an alert for the user; and
   logic configured to send the alert to the user such that the user is notified that a communication with the contact has not occurred for the amount of time.

28. The device of claim 27, wherein if a communication between the contact and the user has occurred, the device further comprising:
   logic configured to analyze content of the communication; and
   logic configured to determine if an alert should be generated based on the analysis of the content.

29. The device of claim 28, wherein the alert is generated when it is determined that a topic has not been discussed in the content.

30. The device of claim 27, wherein the at least two communication modalities accessible to the enterprise or not accessible to the enterprise comprise at least two modalities selected from the set of an email modality, a facsimile modality, a voicemail modality, a web modality, and an instant message modality.

31. The device of claim 27, further comprising logic configured to store the communication records in one or more storage devices.

32. The device of claim 31, wherein the communication records are stored by a unified messaging system.

33. The device of claim 27, wherein the communications records are received from a manual input from the user.

34. The device of claim 27, wherein the contact comprises an identifier for a second user.

35. The device of claim 34, wherein the identifier is a universal identifier that is mapped to a plurality of identifiers in the plurality of communication modalities.

36. A system comprising:
   a first set of end devices associated with a first user, wherein the first set of end devices comprise one or more enterprise end devices configured to communicate on an enterprise system associated with an entity and one or more non-enterprise end devices configured to communicate in at least two modalities not accessible to the enterprise system; and
   a communication manager module comprising:
   logic configured to establish a predetermined communication frequency pattern between the first user and a second user;
   logic configured to determine first records of enterprise communications for the first user communicated with one or more enterprise end devices in the first set in an enterprise system and communicated in at least two modalities over one or more devices, a modality being a mode of communication, and wherein the first records are accessible to the enterprise system;
   logic configured to send one or more agents to the one or more non-enterprise end devices to monitor non-enterprise communications for the first user on one or more non-enterprise end devices, the non-enterprise communications being communicated in at least two modalities over one or more devices not accessible to the enterprise system;
   logic configured to receive second records of non-enterprise communications from the agent at a second device controlled by the enterprise system;

logic configured to measure a communication frequency pattern using the first records of the enterprise communications and second records of the non-enterprise communications; and logic configured to alert the first user and/or the second user when the measured communication frequency pattern between the first and second users in at least two modalities over the one or more devices of the enterprise system and the non-enterprise system does not achieve a predetermined relationship with respect to the predetermined communication frequency pattern.

37. The system of claim 36, further comprising a second set of end devices associated with the second user, wherein end devices in the second set of end devices are configured to communicate in a plurality of communication modalities.

38. The system of claim 37, wherein a first end device in the first set of end devices is configured to communication in a communication modality in the plurality of communication modalities with a second end device in the second set of end devices.

39. The system of claim 36, wherein the first set of end devices comprise an email device, cellular telephone, facsimile device, instant message device, or POTS telephone.

40. A system comprising:

a first set of end devices associated with a first user, wherein the first set of end devices comprise one or more enterprise end devices configured to communicate on an enterprise system associated with an entity and one or more non-enterprise end devices configured to communicate in at least two modalities not accessible to the enterprise system; and a communication manager module comprising:

logic configured to access communication records for a contact of a user, the communication records comprising first records and second records, wherein the first records are of enterprise communications for the user communicated with the one or more enterprise end devices on the enterprise system and communicated in at least two modalities over one or more devices, a modality being a mode of communication, and wherein the first records are accessible to the enterprise system, wherein the second records are of non-enterprise communications received at a second device controlled by the enterprise system from one or more agents sent to the one or more non-enterprise devices to monitor non-enterprise communications for the user, the non-enterprise communications being communicated in at least two modalities over one or more devices not accessible to the enterprise system;

logic configured to determine from the communication records if a communication between the contact and the user has occurred for a predetermined amount of time;

if a communication between the user and the contact has not occurred during the predetermined amount of time, the communication manager module further comprising:

logic configured to generate an alert for the user; and logic configured to send the alert to the user such that the user is notified that a communication with the contact has not occurred for the amount of time in at least two modalities over the one or more devices of the enterprise system and the non-enterprise system.

41. The system of claim 40, further comprising a second set of end devices associated with the contact, wherein end devices in the second set of end devices are configured to communicate in at least two modalities accessible to the enterprise or not accessible to the enterprise.

42. The system of claim 41, wherein a first end device in the first set of end devices is configured to communicate in a modality in the at least two communication modalities accessible to the enterprise or not accessible to the enterprise with a second end device in the second set of end devices.

43. The system of claim 40, wherein the first set of end devices comprise an email device, cellular telephone, facsimile device, instant message device, or POTS telephone.

* * * * *